Feb. 6, 1945. M. PITINSKY ET AL 2,368,678
TEST PROBE
Filed Nov. 17, 1943
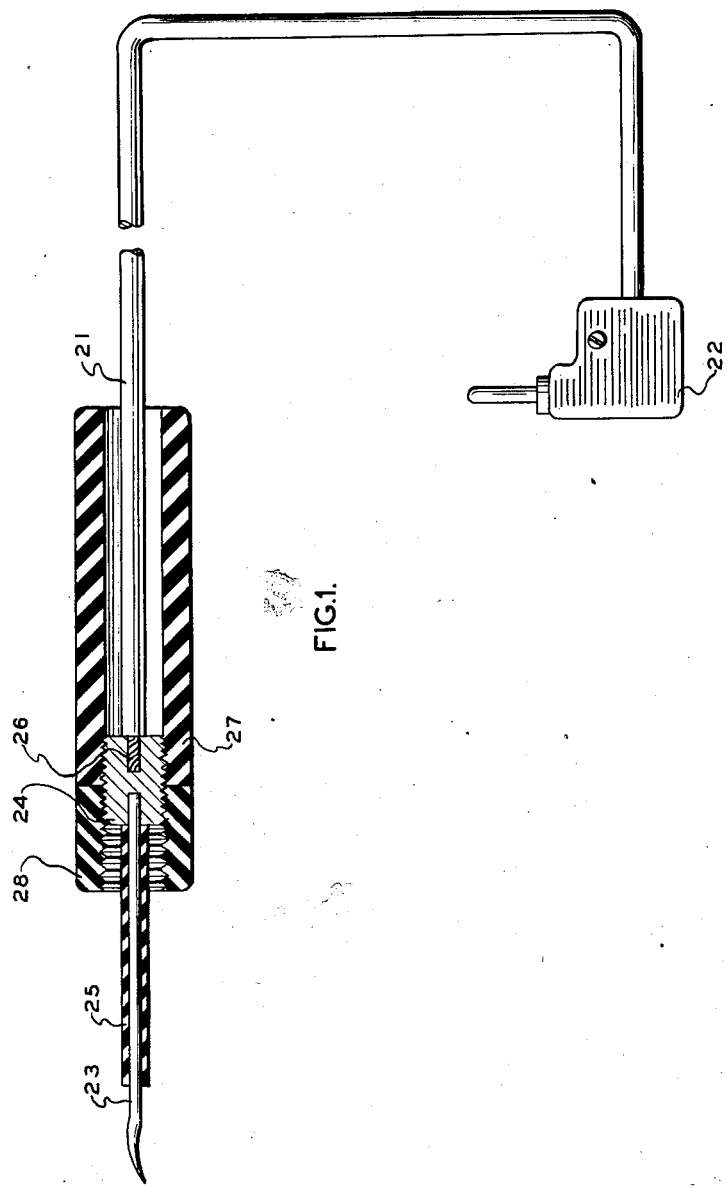
INVENTOR.
H.M. GERST, M.A. SHRIRO &
M. PITINSKY
BY
William D. Hall.
Attorney Patented Feb. 6, 1945

2,368,678

UNITED STATES PATENT OFFICE 2,368,678

TEST PROBE

Morris Pitinsky and Henry M. Gerst, Eatontown, and Morris A. Shriro, Elberon, N. J.

Application November 17, 1943, Serial No. 510,606

3 Claims. (Cl. 173—324)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a testing device, and particularly to a probe which is used in connection with means for making electrical and radio measurements in confined space.

According to conventional practice, probes used in connection with electrical and radio measurements are so constructed that measurements are difficult of attainment in restricted space. With the advent of miniature tubes and the attendant reduction in size of radio units the compactness of same made necessary the design of a probe which could be used in making electrical or radio measurements without the danger of causing electrical short circuits, damaging, or disturbing the components under test.

The object of the present invention therefor, is to provide an improved test probe, the construction of which permits the reduction of electrical short circuits to a minimum when testing radio or electronic equipment.

A further object in the construction of this invention is to make possible tests of equipment in restricted space.

A still further object is to provide a probe capable of making tests of equipment using miniature radio tubes.

In the design of this invention, particular consideration was given to the following conditions.

The probe point of a test probe must be shaped to permit ingress to the orifices in miniature tube sockets now in general use in compact electronic or radio equipment.

The sockets of the aforementioned miniature tubes are so constructed that the contacts are recessed in the orifices of the tube socket a predetermined distance below the surface of same. The orifices of the miniature tube sockets are small in diameter as is well known to those versed in the art, and access to the contacts in the orifices is difficult when using the conventional test probe.

In addition to the aforementioned difficulty encountered in testing electronic or radio equipment using miniature tubes is the compactness of the equipment itself. In such restricted space, the use of conventional probes make tests and measurements difficult.

The invention overcomes this particular obstacle by providing a probe point of sufficient length and small diameter, properly insulated to obviate short circuits, and flexible enough to overcome any tendency toward breaking or bending out of shape.

In the event of damage to the invention, same is so constructed that replacement of any of the parts is rapidly accomplished in a manner which will be described further along.

For a better understanding of the invention, together with other and further objects thereof, reference is made to the following description taken together with the following drawing and its scope will be pointed out in the appended claims.

The accompanying drawing illustrates the invention in cross section and is designated as Figure 1.

Referring now particularly to the drawing, the invention comprises a single conductor cable 21, a conductor 26, terminating in a commercial plug 22, a non-ferrous cylinder 24 threaded externally along its entire length, a handle 27 of dielectric substance threaded internally a predetermined distance, a removable section 28 of said handle 27, an insulating cover 25 and a probe point 23 of predetermined length composed of hardened but resilient wire and being arcuated a predetermined distance from the end thereof.

In the assembly of this invention the cable 21 is inserted in the commercial plug 22 and attached to same by means that are known to those versed in the art. The handle 27 is now slipped over the cable 21 before proceeding with the next step to be described herein.

The conductor 26 of cable 21 is inserted in a recess of predetermined depth along the longitudinal axis of the non-ferrous cylinder 24. Conductor 26 is attached to the said cylinder 24 by soldering same to the said recess of cylinder 24.

The handle 27 may now be screwed on to the cylinder 24 a predetermined distance along the length of said cylinder.

The probe point 23 is wedged into a recess of predetermined distance along the longitudinal axis of cylinder 24 and in juxtaposition to conductor 26. An insulating sleeve 25 is slipped over the probe point 23 and covers the entire probe tip 23 with the exception of a predetermined distance from the arcuated and tapered end of said probe 23.

With the probe tip 23 now in place the lower section 28 of the handle 27 is screwed on the cylinder 24. The entire unit is now ready for use.

Referring now to the entire assembly as illustrated in Figure 1 it can be readily seen that the replacement of any of the parts of the invention is easily accomplished by the expedient of unscrewing sections 27 and 28 which comprise the handle and thus exposing the cylinder 24 and making possible the replacement of the probe point 23 by unsoldering the conductor 26 from the cylinder 24 and replacing same with an assembly comprising probe 23, insulating sleeve 25 and cylinder 24. The assembly comprising 23, 24 and 25 may be assembled beforehand and kept in stock in predetermined quantities so that same may be available for replacement in the manner described herein above.

The construction or design of the probe point 23 is such that ingress to restricted space is readily accomplished. In addition the design of the probe point in the manner illustrated enables the said probe point 23 to be inserted in the orifices of miniature tube sockets in a manner well known to those skilled in the art without damage to this component.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A test probe including a probe rod the outer end of said rod having a point and a curved portion adjacent said point, an interconnecting plug connected to the inner end of said rod, a conductor connected to said plug, said plug electrically interconnecting said rod and said conductor, said conductor being adapted for connecting said probe to an instrument panel, a hollow insulating handle surrounding said conductor and fitting over one end of said plug, and an insulating bushing fitting over the other end of said plug, said handle and said bushing insulatively covering the entire length of said plug.

2. A test probe including a conductor for connecting said probe to an instrument panel, a thin metallic rod terminating in a point and having an axially curved portion intermediate its ends and adjacent said point, an insulator encircling said rod but leaving said point exposed, a metal plug interconnecting said conductor and said rod, and a hollow handle fitting over said plug, said handle being circumferentially split intermediate its ends and adapted, when separated at said split, to expose said plug and to make it accessible for replacing said rod in case of damage.

3. A test probe comprising, a conductor suitable for connecting the probe to an instrument, a metallic test rod having a point adapted for contact with an element of the circuit to be tested, a metallic cylinder joining said conductor and said rod and having a screw thread on its annular surface, a tube of insulation having a screw thread on its inner surface interfitting with the screw thread on said cylinder, and a second tube of insulation having screw thread on its inner surface interfitting with the screw thread on said cylinder said tubes extending beyond the ends of said cylinder and providing a handle and affording a locking arrangement by interengagement with each other at an end of each tube and furnishing delicate adjustment of the distance between the end of said rod and the end of the adjacent tube.

MORRIS PITINSKY.
HENRY M. GERST.
M. A. SHRIRO.